US012387605B2

(12) United States Patent
Haghighat Kashani et al.

(10) Patent No.: US 12,387,605 B2
(45) Date of Patent: Aug. 12, 2025

(54) HAILING SELF DRIVING PERSONAL MOBILITY DEVICES

(71) Applicant: Serve Operating Co., Redwood City, CA (US)

(72) Inventors: Ali Haghighat Kashani, San Francisco, CA (US); Bastian Jan Michael Lehmann, San Francisco, CA (US); Sean Tracey Plaice, San Francisco, CA (US); Nicholas Fischer, San Francisco, CA (US)

(73) Assignee: Serve Operating Co., Redwood City, CA (US)

( * ) Notice: Subject to any disclaimer, the term of this patent is extended or adjusted under 35 U.S.C. 154(b) by 583 days.

(21) Appl. No.: 17/250,970

(22) PCT Filed: Oct. 4, 2019

(86) PCT No.: PCT/US2019/054867
§ 371 (c)(1),
(2) Date: Apr. 2, 2021

(87) PCT Pub. No.: WO2020/073003
PCT Pub. Date: Apr. 9, 2020

(65) Prior Publication Data
US 2022/0005358 A1  Jan. 6, 2022

Related U.S. Application Data

(60) Provisional application No. 62/741,427, filed on Oct. 4, 2018.

(51) Int. Cl.
*B60W 60/00*  (2020.01)
*B60L 58/13*  (2019.01)
(Continued)

(52) U.S. Cl.
CPC .............. *G08G 1/202* (2013.01); *B60L 58/13* (2019.02); *B60W 60/0011* (2020.02);
(Continued)

(58) Field of Classification Search
None
See application file for complete search history.

(56) References Cited

U.S. PATENT DOCUMENTS 9,970,615 B1 *  5/2018  Cardillo ................... G08G 1/20
2015/0199619 A1  7/2015  Ichinose et al.
(Continued)

FOREIGN PATENT DOCUMENTS

WO     2017164922     9/2017

OTHER PUBLICATIONS

PCT International Search Report and Written Opinion, mailed Jan. 24, 2020, PCT/US19/54867.

*Primary Examiner* — James J Lee
*Assistant Examiner* — Tawri M McAndrews
(74) *Attorney, Agent, or Firm* — Weaver Austin Villeneuve & Sampson LLP (57) ABSTRACT

Techniques described in this application are directed to determining safe path navigation of an autonomous personal mobility device, including a self-driving electric scooter, using sensors and/or data from other sources. The autonomous personal mobility device is configured to generate maps and transform the maps into tile segments that can be shared with other autonomous personal mobility devices. Techniques further include receiving a request for an autonomous personal mobility device at a location, and enabling the autonomous personal mobility device to self-drive to the location.

12 Claims, 8 Drawing Sheets

(51) Int. Cl.
*G06V 20/58* (2022.01)
*G08G 1/00* (2006.01)
(52) U.S. Cl.
CPC .. *B60W 60/0023* (2020.02); *B60W 60/00253* (2020.02); *B60W 60/0053* (2020.02); *G06V 20/58* (2022.01); *B60W 2300/365* (2013.01); *B60W 2540/041* (2020.02); *B60W 2540/043* (2020.02); *B60W 2556/45* (2020.02)

(56) References Cited

U.S. PATENT DOCUMENTS

| | | |
|---|---|---|
| 2017/0124476 A1 | 5/2017 | Levinson et al. |
| 2018/0101179 A1 | 4/2018 | Louey et al. |
| 2019/0064805 A1* | 2/2019 | Frazzoli ............... G05D 1/0061 |
| 2021/0095978 A1* | 4/2021 | Letwin ............... G01C 21/3602 |
| 2021/0096564 A1* | 4/2021 | Panigrahi ............... G08G 1/205 |

* cited by examiner

HAILING SELF DRIVING PERSONAL MOBILITY DEVICES

CROSS-REFERENCES TO RELATED APPLICATIONS

The present application is a U.S. national phase under 35 U.S.C. § 371 of International Application No. PCT/US19/54867, filed Oct. 4, 2019, which claims priority to and the benefit of U.S. Provisional Patent Application No. 62/741,427, filed Oct. 4, 2018, both of which are incorporated by reference in their entireties for all purposes.

BACKGROUND OF THE INVENTION

The Personal Mobility Devices (PMD) such as electric scooters and bicycles have met strong public reception as they provide a valuable addition to the array of urban mobility options. Urban dwellers across the world have come to depend on ride sharing services. The average ride sharing distance is 5 to 7 miles. In cities that suffer from street congestion, trips with shorter distances in the 1 to 2 mile range present challenges to consumers. For example, while walking may be feasible, having to spare 30 to 40 minutes may not be an option. Given the challenges and costs of parking, driving a personal vehicle may not be convenient. Ride sharing may prove to be expensive and/or time-consuming for frequent commuting needs or during rush hours. The use of bicycles have been on the rise, but their physical demand for users of various age and mobility capabilities, access to safe storage, and clothing requirements make bicycles less than ideal for many users.

Shared PMDs, on the other hand, address most of the above challenges. It is possible to cover a few miles in a short period of time. PMDs are 20% faster than pedal bikes, and are often not affected by traffic. PMDs do not require parking or secure storage. PMDs are inexpensive, costing 80% less than operating a personal car. PMDs are less physically demanding compared to bicycles and they do not impose many requirements on clothing.

While the PMDs are popular, shared PMDs suffer from one major issue: they are often hard to find, particularly in peak hours when they are needed the most. To find a PMD, users are sometimes required to walk a number of blocks, at times in the opposite direction of their destination and while under time pressure. It is possible for no PMD to be within range. It is also a frequent occurrence to walk to one and find it not suitable for use, or have it taken by another user first. One solution is to deploy a large volume of PMDs in each city to make them more available and within a closer range of users. However, cities have already begun restricting the number of electric scooters permitted on their sidewalks. Increasing the number of PMDs results in clutter, jamming and littering of the sidewalks, making it a nuisance to other sidewalk and road users.

Embodiments address these and other problems.

BRIEF SUMMARY OF THE INVENTION

One aspect of the present disclosure relates to systems and methods for an autonomous personal mobility device to self-drive to a target location where the autonomous personal mobility device is requested. For example, embodiments provide a method implemented by a processor of an autonomous personal mobility device, the method comprising receiving, from a central server via a communication network, a notification including a target location. In some embodiments, the notification received from the central server may include user identifying information. The method also includes running an autonomous driving program to reach the target location using a predetermined path. The autonomous personal mobility device may identify one or more obstacles on the predetermined path in real time. The method includes running an obstacle avoidance program to avoid the one or more obstacles on the predetermined path. The obstacle avoidance program implements one or more modifications to the predetermined path. The autonomous personal mobility device auto-drives (e.g., self-drives) to reach the target location. According to various embodiments, the target location may be located at an area closed to vehicular traffic and the predetermined path travels through areas closed to vehicular traffic.

In some embodiments, the notification received from the central server may include the predetermined path to the location. In such embodiments, the method may also include once at the location, receiving a user identifier from a user. The user may enter the user identifier using a keypad coupled to the autonomous personal mobility device. Alternatively, the autonomous personal mobility device may receive the user identifier from a user device (for example, via near-field communication (NFC) capability of the autonomous personal mobility device or by scanning a barcode displayed on the user device). The method may also include comparing the user identifier received from the user with the user identifying information received from the central server, determining that the user identifier received from the user matches with the user identifying information received from the central server; and switching control of the autonomous personal mobility device to the user based on determining that the user identifier received from the user matches with the user identifying information received from the central server.

In some embodiments, the autonomous personal mobility device may calculate the path to the location itself. In such embodiments, the method may also include calculating remaining charge of a power source of the autonomous personal mobility device, and calculating the predetermined path to the location based on at least the remaining charge.

According to various embodiments, the method may also include classifying the one or more obstacles as dynamic obstacles or static obstacles; and estimating a trajectory for the dynamic obstacles, wherein the obstacle avoidance program avoids the dynamic obstacles based on the estimated trajectory.

In some embodiments, the method may also include upon receiving the notification including the location from the central server: sending, to the central server via the communication network, an acknowledgement message; and detaching from a parking station.

In some embodiments, the method may also include creating a map of surrounding environment; and localizing the autonomous personal mobility device within the map as well as within a global reference frame. The obstacle avoidance program avoids the one or more obstacles on the predetermined path based on the map and localization of the autonomous personal mobility device within the map. The method may further include transforming the map to a plurality of tile segments; and transmitting the plurality of tile segments to a remote server or one or more additional autonomous personal mobility devices.

Embodiments may provide an autonomous personal mobility device comprising a vehicle system including mechanics and a power source to propel the autonomous personal mobility device along a path, a processor coupled to the vehicle system; and a non-transitory computer readable media coupled to the processor. The non-transitory computer readable media includes instructions that, when executed by the processor, cause the processor to perform the above-identified method steps.

Another aspect of the disclosure comprises a method implemented by a central server. The method includes receiving, at a central server from a user device, a request for an autonomous personal mobility device at an identified location. The method also includes identifying, by the central server, one or more available autonomous personal mobility devices within a predetermined distance of the identified location. The method further includes calculating, by the central server, battery life of the one or more available autonomous personal mobility device based on a distance between each autonomous personal mobility device and the identified location. The method also includes selecting, by the central server, an autonomous personal mobility device based on availability and battery life. The central server may calculate a specific path for the selected autonomous personal mobility device to reach the identified location. The predetermined path travels through areas closed to vehicular traffic. The central server may transmit a notification to the selected autonomous personal mobility device via a communication network, the notification including the specific path to the identified location and user identifying information. The method further includes tracking, by the central server, a real-time location of the selected autonomous personal mobility device.

In some embodiments, the method may also include receiving, by the central server, an acknowledgement message from the selected autonomous personal mobility device. The central server may transmit, to the user device, a first notification including one or more of a unique device identifier for the selected autonomous personal mobility device, a real-time updated location of the selected autonomous personal mobility device, and an estimated arrival time. The central server may determine that the selected autonomous personal mobility device is at the identified location. The method may also include transmitting a second notification to the user when the selected autonomous personal mobility device is at the identified location.

DETAILED DESCRIPTION OF THE INVENTION

The description provided herein includes illustrative embodiments only and is not intended to limit the scope, applicability, or configuration of the disclosure. Rather, the description will provide those skilled in the art with an enabling description for implementing a preferred exemplary embodiment. It is understood that various changes may be made in the function and arrangement of elements without departing from the scope as set forth in the claims.

Embodiments of the application describe various improvements to systems, methods, and devices for hailing an self-driving (e.g., autonomous or semi-autonomous) personal mobility device. Embodiments may include converting existing personal mobility devices (PMDs) to drive autonomously, and/or building new PMDs capable of self-driving, to enable users to hail them on demand.

A PMD refers to a vehicle with a step-through frame designed to travel on a designated path that is closed to vehicular traffic (e.g. closed to road vehicles including automobiles, trucks, buses). The step-through frame differentiates the PMD from cars or motorcycles as it allows for mounting the PMD by stepping on the PMD through the frame of the PMD. As used herein, the step-through frame refers to a step-on frame without a side frame. A typical road vehicle would have an enclosed step-in frame (e.g. an automobile) including top frame (with the exception of convertible automobiles) and a side frame with a door or without a door (e.g., Jeeps with no side doors), or a mount-on frame that does not allow stepping through (e.g., a motorcycle).

The designated route for a PMD may include sidewalks or designated road lanes (e.g., bicycle lane, PMD lane, pedestrian lane). While PMD is capable to travel through areas closed to vehicular traffic in a matter that automobiles, buses, trucks and/or motorcycles cannot do, the PMD may also travel through routes open to vehicular traffic as well. That is, a portion of the path that the PMD follows to reach a target destination may include a road segment shared with other motorized vehicles.

In some embodiments, a PMD may be designed to propel only a single person (e.g. a rider). That is, a maximum number of persons on a PMD is one. Embodiments may be applicable to PMDs that may be designed and allowed by law to carry two riders. An exemplary PMD may be an electric scooter. According to various embodiments, the electric scooters may include electric kick scooters, medical scooters, hoverboards, power chairs, etc. A PMD may be two wheeled or three wheeled. In some embodiments, a PMD may be four-wheeled, such as a medical scooter. In some embodiments, the PMD may have a motor power between 20 W-10,000 W, or between 200 W-7,000 W, or between 150 W-6,000 W.

According to various embodiments, an exemplary self-driving personal mobility device (SPMD) may be equipped with sensors including but not limited to computer vision cameras, LIDAR (e.g., Light Detection And Ranging) sensors, a global positioning system (GPS) transmitter/receiver, an inertial measurement unit (IMU), ultrasonic range sensors, stereo-cameras, depth cameras, wheel encoders and bump sensors, among other mechanical components necessary for the SPMD to self-drive to a target location.

The sensors may be used for various autonomy purposes, including to create a map of the surrounding environment using algorithms such as SLAM (simultaneous localization and mapping), as well as localizing the SPMD in a global reference frame. The maps may contain spatial information that allow a SPMD to identify its location within the map in addition to its relation to semantic layers of geo-referenced temporally static information such as, but not limited to, sidewalk edges, street furniture, vegetation, valid SPMD parking areas, curb-cuts, and pedestrian crosswalks.

Upon receiving a target location indication from a central server, the SPMD may self-drive itself to the target location. The SPMD may receive a predetermined path to the target location. Alternatively, the SPMD may generate the predetermined path itself. In some embodiments, the SPMD may generate smaller sized tile segments of the maps. These tile segments may be shared with the central server or other SPMDs to improve the autonomous movement of the SPMDs.

These and other improvements are discussed throughout the disclosure.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

Mobility System and User Experience

Various embodiments provide for a user to hail a self-driving (e.g., autonomous or semi-autonomous) personal mobility device (SPMD). The user may utilize an internet-connected digital user device such as a phone, a tablet, a personal computer, or a smart watch, to request a SPMD to a target location. According to various embodiments, the target location may be located at an area closed to vehicular traffic. That is, the target location may be located on a sidewalk or on a designated route which is closed to road vehicles such as automobiles, buses, trucks, etc.

Figure 1:
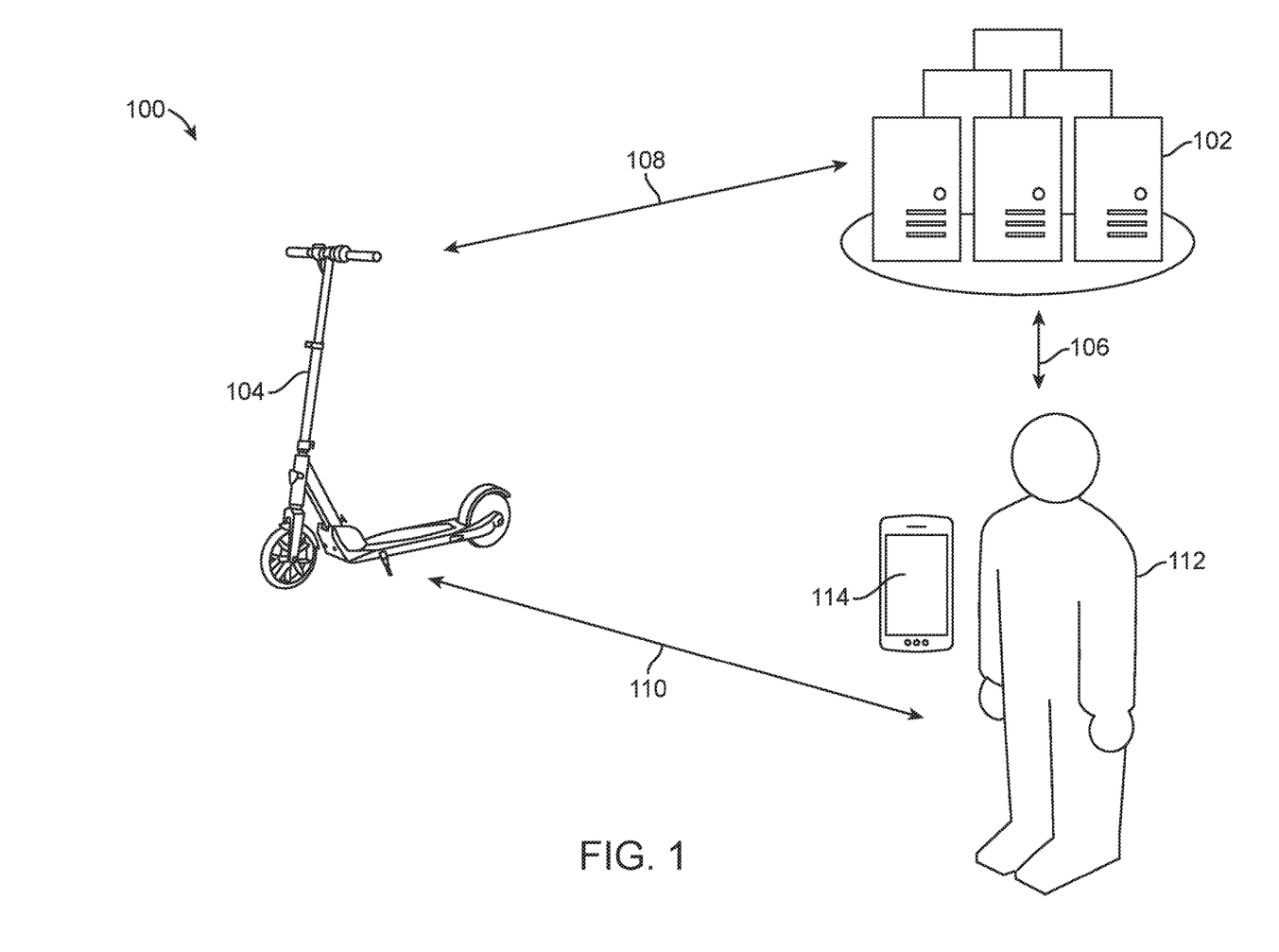
FIG. 1 is a block diagram illustrating a mobility system including a central server, a user and a self-driving personal mobility device (SPMD) according to an embodiment of the disclosure.

FIG. 1 illustrates a mobility system 100 including a user 112 interacting with a user device 114 to request a SPMD 104 from one or more central server(s) 102. For example, a SPMD ride share application may be installed on the user device 114. The user 112 may launch the SPMD ride share application on the user device 114 and communicate with the central server 102 via a communication network 106 such as, for example, the internet or a cellular network. The user 112 may specify his/her own current location by manually entering the target location or as identified by a GPS sensor of the user device 114. In some embodiments, the user 112 may specify a desired target location different than their current location (e.g., the user 112 may request the SPMD for someone else or may request the SPMD to a target location where the user will be in the near future), or schedule a future ride. In some embodiments, the user 112 may also specify a destination address to receive a cost estimate. Once the details of the request are entered on the user device 114, the request for a SPMD at an identified (e.g., target) location may be transmitted to the central server 102 via the communication network 106.

The request may be processed at the central server 102. The central server 102 may identify one or more available and operational SPMDs within a predetermined distance of the identified location based on the user's request. In some embodiments, the central server 102 may calculate battery life (e.g., remaining battery charge) of the one or more available SPMDs based on a distance between each SPMD and the identified location. The central server 102 may identify a subset of the identified available and operational SPMDs as suitable SPMDs based on an estimated battery life required for the SPMD to reach the target location and available battery life for each of the identified available and operational SPMDs. For example, the suitable SPMDs may have available battery life greater than or equal to the estimated battery life required to reach the target location.

The central server 102 may then select a nearby available and operational SPMD with enough available battery life. The selected SPMD 104 may be capable of communicating with the central server 102 via a communication network 108 such as the internet or the mobile data network. The selected SPMD 104 may receive a notification from the central server 102 via the communication network 108 about the new request (e.g., booking). The notification may include a target location for the selected SPMD 104 to autonomously or semi-autonomously drive to in order to meet the user 112 (or a person designated by the user). In some embodiments, the target location included in the notification may be determined by the central server 102 to guide the SPMD 104 to a parking station or to a maintenance location. Using this capability, the central server 102 may gather SPMDs 104 in its fleet that may have been abandoned on sidewalks or that need maintenance. According to various embodiments, the SPMDs may be capable of being driven remotely by human operators when in need of assistance.

In some embodiments, the central server 102 may calculate a specific path for the selected SPMD to reach the target location identified by the user 112. In such embodiments, the notification transmitted by the central server 102 to the selected SPMD 104 may include the specific path to the identified location and user identifying information. In other embodiments, the selected SPMD 104 may calculate the specific path to the target location on its own. For example, the selected SPMD 104 may calculating remaining charge of a power source of the SPMD 104, and calculate the predetermined path to the target location based on at least the remaining charge.

Upon receiving the notification, the selected SPMD 104 may acknowledge the request, unlock itself (e.g., detach from a parking station), and run an autonomous driving program to reach the target location using the predetermined path. For example, the selected SPMD 104 may use its electric motors and its self-driving technology to traverse to the target location. In some embodiments, the selected SPMD 104 may be configured to travel on sidewalks, bicycle lanes, streets, or a combination thereof. Given its narrow profile, a SPMD does not occupy a large space and may fit in pathway.

Once the selected SPMD 104 receives the notification from the central server 102, the selected SPMD 104 may transmit an acknowledgement message to the central server 102. The central server 102 may transmit a first notification message to the user 112 confirming the reservation. The first notification message may include one or more of a unique device identifier associated with the selected SPMD 104, a real-time updated location of the selected SPMD 104, and an estimated arrival time to the identified (e.g., target) location.

While the selected SPMD 104 self drives to the target location, the central server 102 may track a real-time location of the selected SPMD 104 remotely. According to various embodiments, the central server 102 may periodically update the user 112 and/or the ride sharing application installed on the user device 114 with the real-time location of the selected SPMD 104.

Once the selected SPMD 104 arrives at the identified location, the user 112 may be informed. Using the unique device identifier such as a name or a number, the user 112 may find their SPMD, unlock the SPMD using their SPMD ride sharing application, and board the selected SPMD 104 to get to their destination.

In some embodiments, the SPMD 104 may be driven manually by the user 112 once the user 112 boards the SPMD 104, as the self-driving capabilities are no longer necessary. Not having to self-drive while users are on-board increases SPMD's battery life, and removes injury liability.

Central Server

Figure 2:
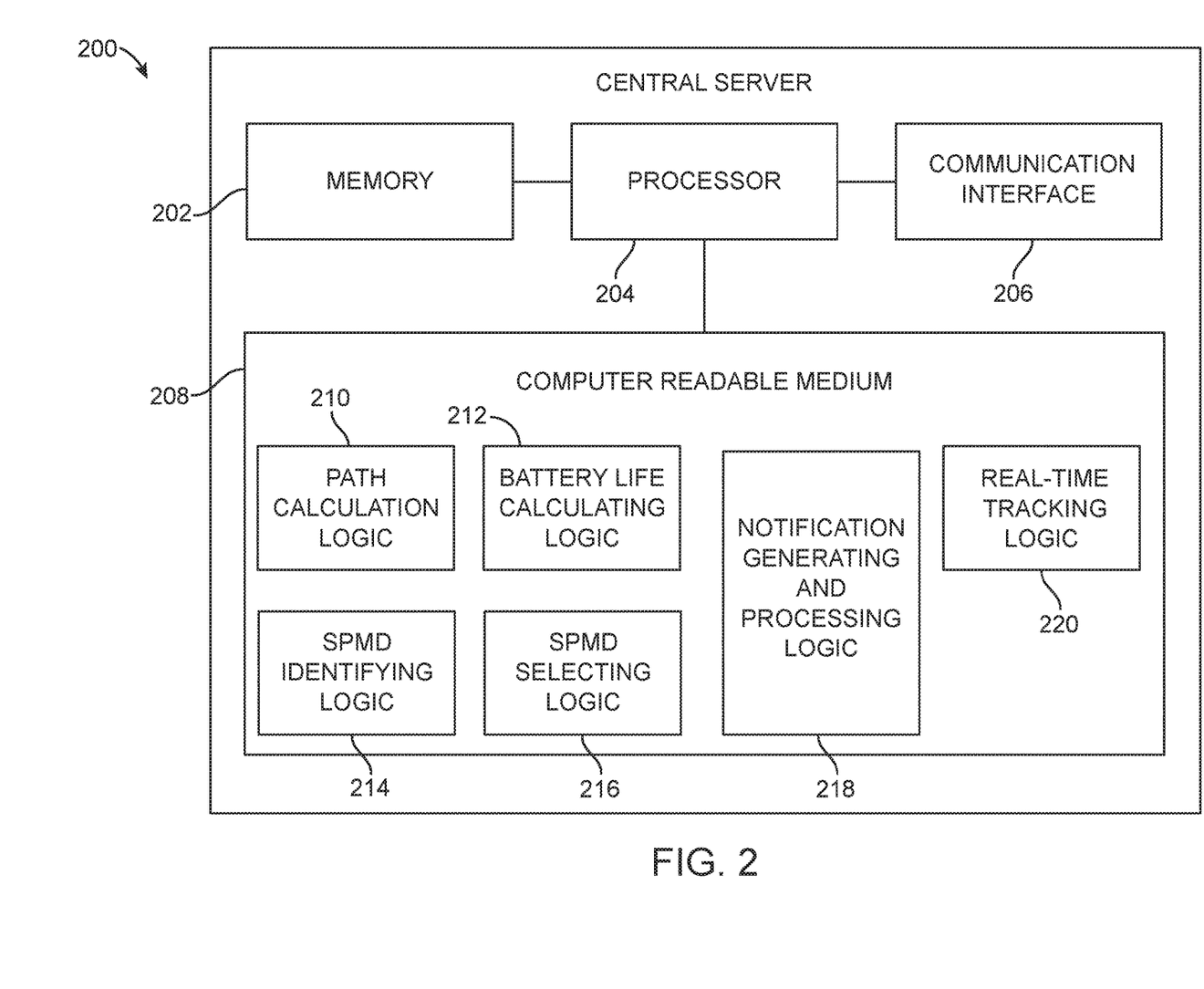
FIG. 2 is a block diagram illustrating a central server according to an embodiment of the disclosure.

FIG. 2 is a block diagram illustrating a central server 200 according to an embodiment of the disclosure. The central server 200 is typically a powerful computer or cluster of computers. For example, the central server 200 can be a large mainframe, a minicomputer cluster, or a group of servers functioning as a unit. The central server 200 may include a memory 202, a processor 204, a communication interface 206 and a computer readable medium 208. The computer-readable medium may store instructions that are executable by the processor 204.

The memory 202 may be any suitable device or devices that can store electronic data. The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

The processor 204 may include any suitable data computation device or devices. The processor 204 may comprise one or more microprocessors working together to accomplish a desired function. The processor 204 may include CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The communication interface 206 may include an interface that can allow the central server 200 to communicate with external processors. Communication interface 206 may enable the central server 200 to communicate data to and from another device (e.g., the SPMD, the user device). Some examples of communication interface 206 may include a modem, a physical communication interface (such as an Ethernet card or other Communication interface Card (NIC)), a virtual communication interface, a communications port, a Personal Computer Memory Card International Association (PCMCIA) slot and card, or the like. The wireless protocols enabled by communication interface 206 may include Wi-Fi™. Data transferred via communication interface 206 may be in the form of signals which may be electrical, electromagnetic, optical, or any other signal capable of being received by the external communications interface. These signals that may comprise data or instructions may be provided between communication interface 206 and other devices via a communications path or channel. Any suitable communication path or channel may be used such as, for instance, a wire or cable, fiber optics, a telephone line, a cellular link, a radio frequency (RF) link, a WAN or LAN network, the Internet, or any other suitable medium. The communication interface 206 can utilize a long range communication channel as well as a short range communication channel.

The computer readable medium 208 may comprise code, executable by the processor 204, to implement a method comprising receiving, at a central server from a user device, a request for a SPMD at an identified location; identifying, by the central server (for example using a SPMD identifying logic 214), one or more available SPMDs within a predetermined distance of the identified location; calculating, by the central server (for example using a battery life calculating logic 212), battery life of the one or more available SPMD based on a distance between each SPMD and the identified location; selecting, by the central server (for example using a SPMD selecting logic 216), a SPMD based on availability and battery life; calculating, by the central server (for example using a path calculation logic 210), a specific path for the selected SPMD to reach the identified location; transmitting, by the central server (for example using a notification generating and processing logic 218), a notification to the selected SPMD via a communication network, the notification including the specific path to the identified location and user identifying information; and tracking, by the central server (for example using a real-time tracking logic 220), a real-time location of the selected SPMD. In some embodiments, the method may also include: receiving, by the central server, an acknowledgement message from the selected SPMD; generating and transmitting, by the central server to the user device (for example using the notification generating and processing logic 218), a first notification including one or more of a unique device identifier for the selected SPMD, a real-time updated location of the selected SPMD, and an estimated arrival time; determining, by the central server (for example using the real-time tracking logic 220), that the selected SPMD is at the identified location; generating and transmitting, by the central server (for example using the notification generating and processing logic 218), a second notification to the user when the selected SPMD is at the identified location.

Self-Driving Personal Mobility Device (SPMD)

Figure 3:
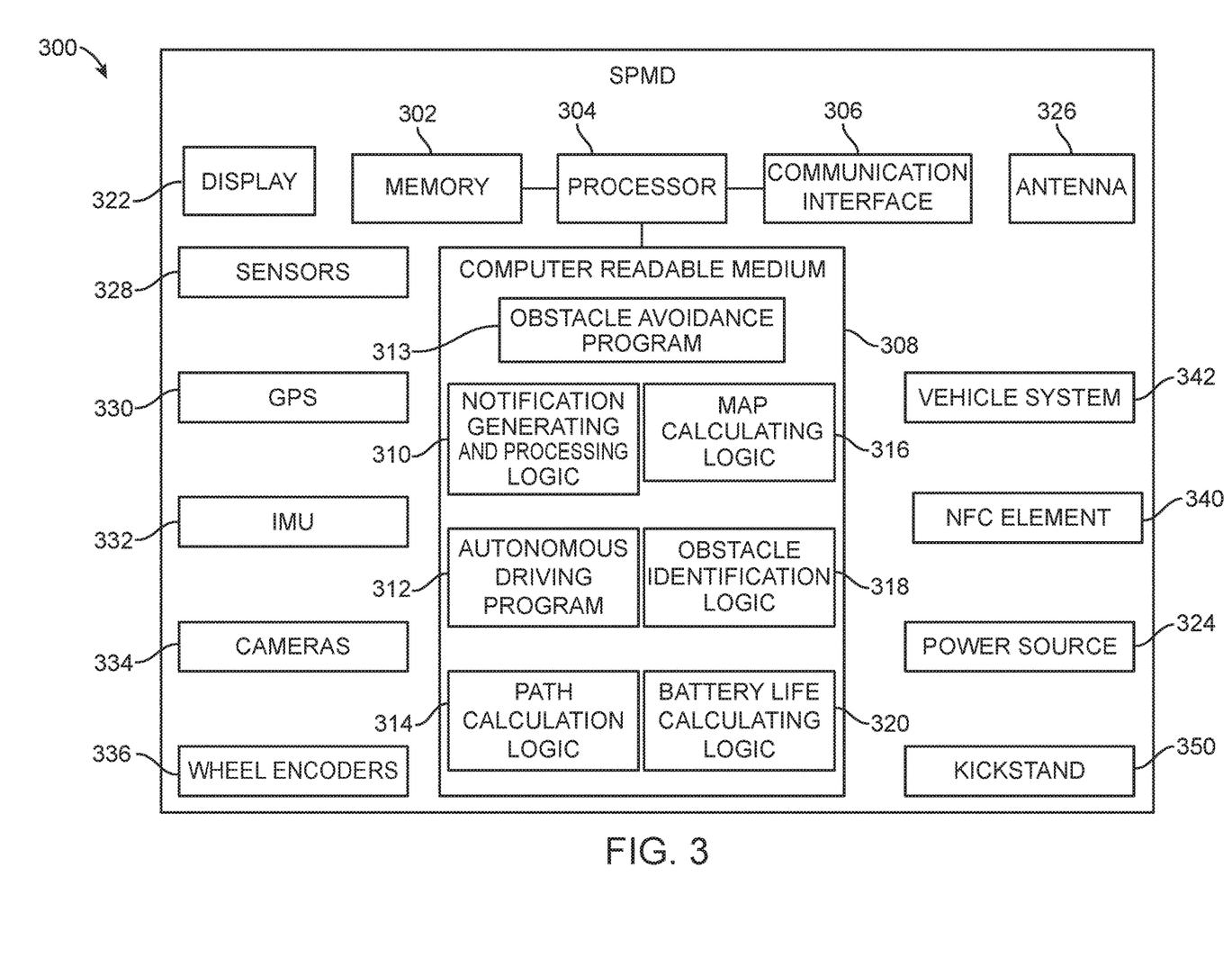
FIG. 3 is a block diagram illustrating an example of a SPMD according to an embodiment of the disclosure.

FIG. 3 is a block diagram illustrating an example of a SPMD 300 according to an embodiment of the disclosure. In one example, the SPMD 300 may include one or more of a display 322, a power source 324 (e.g., a battery) for allowing the SPMD 300 to self-drive, one or more sensors 328 (e.g., LIDAR (e.g., Light Detection And Ranging) sensors, ultrasonic range sensors, bump sensors), one or more cameras 334 (e.g., computer vision cameras, stereo-cameras, depth cameras), a global positioning system (GPS) transmitter/receiver 330, an inertial measurement unit (IMU) 332 (capable of measuring force, angular rate, and orientation of the SPMD), wheel encoders 336, an antenna 326 to communicate with the GPS or other computer systems, among other mechanical components necessary for the SPMD to self-drive to a target location. For example, the SPMD 300 may include a set of components collectively referred as a vehicle system 342. The vehicle system 342 may be associated with mechanics and power source to propel SPMD 300 along a path, including one or more of a chassis with two or four wheels, gearbox, drivetrain, motor, controller, transmission, and the like.

The SPMD 300 may also include a memory 302, a processor 304, a communication interface 306 and a computer readable medium 308. The computer-readable medium may store instructions that are executable by the processor 304.

The memory 302 may be any suitable device or devices that can store electronic data. The memory 302 can be used to store data and code. The memory 302 may be coupled to the processor 304 internally or externally (e.g., cloud based data storage), and may comprise any combination of volatile and/or non-volatile memory, such as RAM, DRAM, ROM, flash, or any other suitable memory device. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

The processor 304 may control the operation of the SPMD 300 and may comprise one or more Application Specific Integrated Circuits (ASICs) or Field Programmable Gate Arrays (FPGAs). The processor 304 may include single core and/or multicore processors. The processing resources of the SPMD 300 may be organized into one or more processing units. A processing unit may include one or more processors, one or more cores from the same or different processors, a combination of cores and processors, or other combinations of cores and processors. In some embodiments, the processor 304 may include one or more special purpose co-processors such as graphics processors, Digital Signal Processors (DSPs), or the like. In some embodiments, the processor 304 may be implemented using customized circuits.

In some embodiments, the processor 304 may execute instructions stored on the computer readable medium 308. In various embodiments, the processor 304 may execute a variety of programs or code instructions and may maintain multiple concurrently executing programs or processes. At any given time, some or all of the program code to be executed may be resident on the computer readable medium 308 including potentially on one or more storage devices. Through suitable programming, the processor 304 may provide various functionalities described herein.

According to various embodiments, the SPMD 300 may stay upright using a kickstand 350 that, when deployed (either manually by the user or automatically via software), passively stabilizes the orientation of the SPMD 300 using multiple points of contact such that SPMD 300 may maneuver autonomously (or via teleoperation) without falling over. When the SPMD 300 is manually operated by the user, the stabilizing kickstand 350 is retracted (either manually by the user or automatically via software). In some embodiments, the SPMD may be mechanically passively stable (e.g. without requiring a kickstand). For example, the SPMD may include devices with three or more wheels (e.g. three or more points of contact).

According to various embodiments, an SPMD may travel on two-wheels while on auto-drive or while being controlled by a user (e.g., while the SPMD is in motion). Such a two-active wheeled SPMD may include a third wheel that is extended for active use while the SPMD is stopped or is on stand-by mode (e.g. while the SPMD is not in motion or while the SPMD is starting or stopping). The third wheel may be smaller than the two active wheels of the SPMD and may be retracted once the SPMD is in motion. In other embodiments, the SPMD may be configured to have three or more active (e.g., non-retractable) wheels at all times.

Since the SPMD 300 would be unable to operate while tipped over, it is important for the SPMD 300 to understand when it has fallen over. In some embodiments, the IMU 332, in conjunction with the processor 304, may compute an orientation of the SPMD 300 using an online estimator that fuses data from an accelerometer and a gyroscope of the IMU 332. While fallen over, the SPMD 300 could also report to the central server, for example via a communication interface 306, that the SPMD 300 is currently not available for self-driving capabilities.

The communication interface 306 may include an interface that can allow the SPMD 300 to communicate with external processors. Communication interface 306 may enable the SPMD 300 to communicate data to and from another device (e.g., the central server, the user device). Some examples of the communication interface 306 may include a modem, a physical communication interface (such as an Ethernet card or other Communication interface Card (NIC)), a virtual communication interface, a communications port, a Personal Computer Memory Card International Association (PCMCIA) slot and card, or the like. The wireless protocols enabled by communication interface 306 may include Wi-Fi™. Data transferred via communication interface 306 may be in the form of signals which may be electrical, electromagnetic, optical, or any other signal capable of being received by the external communications interface (collectively referred to as "messages"). These messages that may comprise data or instructions may be provided between communication interface 306 and other devices via a communications path or channel. Any suitable communication path or channel may be used such as, for instance, a wire, fiber optics, a cellular link, a radio frequency (RF) link, a WAN or LAN network, the Internet, advanced data network technology, such as 3G, 4G, EDGE (enhanced data rates for global evolution), WiFi (IEEE 802.XX family standards) or other mobile communication technologies, or any combination thereof.

The computer readable medium 308 may comprise code, executable by the processor 304, to implement a method comprising receiving, from a central server via a communication interface, a notification including a target location; running an autonomous driving program 312 to reach the target location using a predetermined path; identifying one or more obstacles on the predetermined path in real time (for example using an obstacle identification logic 318); running an obstacle avoidance program 313 to avoid the one or more obstacles on the predetermined path, wherein the obstacle avoidance program 313 implements one or more modifications to the predetermined path; and auto-driving (for example by executing the autonomous driving program 312) to reach the target location. According to various embodiments, the target location may be located at an area closed to vehicular traffic. That is, the target location may be located on a sidewalk or on a designated route which is closed to road vehicles such as automobiles, buses, trucks, etc. Similarly, the predetermined path travels through an area closed to vehicular traffic. That is, the predetermined path travels through one or more of a sidewalk or a designated route which is closed to road vehicles such as automobiles, buses, trucks, etc. In some embodiments, the predetermined path may include a road segment shared with other motorized vehicles.

According to various embodiments, the one or more modifications to the predetermined path may be within one or more predetermined thresholds for time (e.g., remaining battery charge time, time to the target location, time to the destination), distance (e.g., distance to the target location), or speed (e.g., of the SPMD or the dynamic obstacle). For example, the autonomous driving program 312 may be configured to operate the vehicle system 342 of the SPMD 300 according to the predetermined path. The autonomous driving program 312 may identify a direction for the SPMD 300 (e.g., proceed northeast, rotate 35 degrees and proceed forward) and provide instructions for moving substantially in the identified direction to the vehicle system 342. The instructions may initiate movement with the chassis, wheels, and other components of the SPMD 300 to operate SPMD 300 in the direction identified.

In some embodiments, the SPMD 300 may calculate the path to the target location (e.g., the predetermined path). In such embodiments, the method may also comprise calculating (for example using battery life calculating logic 320) remaining charge of a power source 324; and calculating (for example using the path calculating logic 314) the predetermined path to the target location based on at least the remaining charge.

According to various embodiments, the SPMD 300, upon arriving at the target location indicated by the user, may receive a user identifier of the user (for example via a near-field communication element 340). The SPMD 300 may compare the user identifier received from the user with the user identifying information received from the central server. If the user identifier received from the user matches with the user identifying information received from the central server, the SPMD 300 may switch control (of the SPMD) to the user.

In some embodiments, the obstacle identification logic 318, when executed by the processor 304 may classify the one or more obstacles as dynamic obstacles such as other road users (e.g., pedestrians, bicyclist, animals, cars) or static obstacles (e.g., walls, poles, parking meters). For those obstacles classified as dynamic, the obstacle identification logic 318, when executed by the processor 304, may estimate a trajectory. The obstacle avoidance program 313, when executed by the processor 304, may help the SPMD 300 to avoid the dynamic obstacles on the predetermined path based on the estimated trajectory of the dynamic objects.

According to various embodiments, the SPMD 300 may include a notification generating and processing logic 310 that may process the notifications received from the central server or the user device, and may generate notifications (e.g., an acknowledgement message) that may be transmitted to the central server and/or the user device. For example, the SPMD 300 may be parked at a parking station when the SPMD 300 receives the notification including the target location from the central server. The SPMD 300 may generate and transmit the acknowledgement message to the central server and detach itself from the parking station to self-drive itself to the target location indicated in the notification.

According to various embodiments, the SPMD 300 may include a map creating logic 316 that, when executed by the processor 304, may create a map of surrounding environment and localize the SPMD 300 within the map as well as within a global reference frame. The localization and mapping processing by the SPMD is explained below in greater detail in connection with FIG. 4. The obstacle avoidance program 313 may avoid the one or more obstacles on the predetermined path based on the map and localization of the SPMD 300 within the map. The obstacle detection, classification and navigation processing by the SPMD is explained below in greater detail in connection with FIG. 5.

Figure 4:
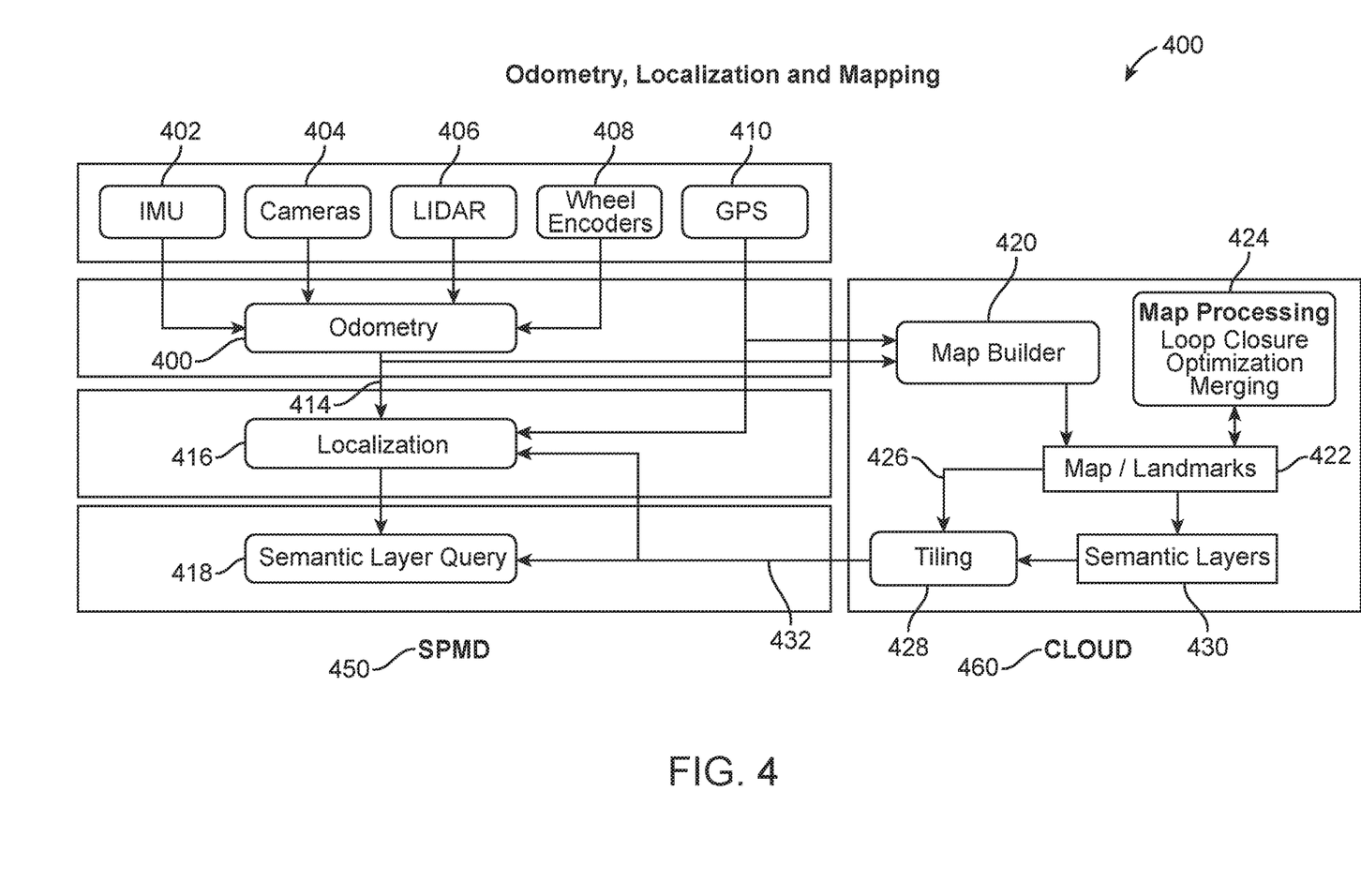
FIG. 4 is a block diagram illustrating an exemplary localization and mapping processing by the SPMD according to an embodiment of the disclosure.

FIG. 4 is a block diagram illustrating an exemplary localization and mapping processing 400 by the SPMD according to an embodiment of the disclosure. According to various embodiments, the SPMD may generate maps in various ways including, for example, by fusing data from various sources such as IMU 402, one or more cameras 404, LIDAR 406, wheel encoders 408 and GPS sensor 410 of an exemplary SPMD 450. An odometry calculating logic 412 of the SPMD 450 may estimate an odometry (e.g., a change in motion, egomotion) of the SPMD 450 over time.

The generated odometry estimate 414 may be transmitted to a map builder 420 that, in some embodiments, may be stored remotely on a cloud-based server 460 or a remote server. The map builder 420 may use the odometry estimate 414 to accumulate pose and time-labeled representations of various sensor data (such as images or point clouds). The accumulation of these sensor data result in a data structure 422 that contains strong observable spatial anchors (e.g., landmarks that represent the most statistically interesting information) present in the data-representation of the surroundings. The data structure 422 may then be optimized using techniques 424 such as bundle adjustment, calculating loop closures, and statistical merging of other accumulated data structures to yield a single, geo-referenced map 426. A tiling logic 428 may transform the geo-referenced map 426 into smaller tile segments 432 for any area that the SPMD 450 may need to operate in. According to various embodiments, the tile segments may be uniformly-sized. The tiling logic 428 may incorporate data form semantic layers 430 of geo-referenced temporally static information including, but not limited to, sidewalk edges, street furniture, vegetation, valid SPMD parking areas, curb-cuts, and pedestrian crosswalks in the uniformly-sized tile segments 432.

Figure 6A:
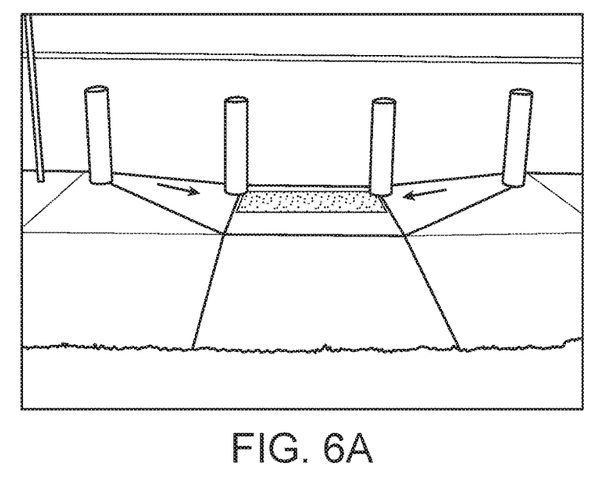
FIGS. 6A-6D are illustrative examples of environments traveled by the SPMD according to embodiments of the disclosure.
Figure 6B:
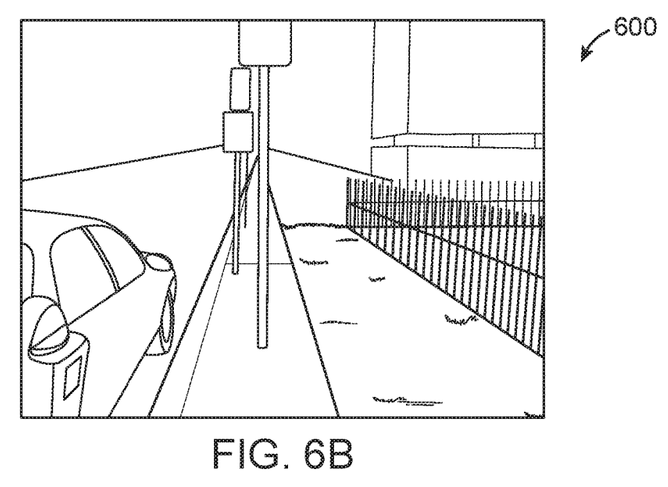
Figure 6C:
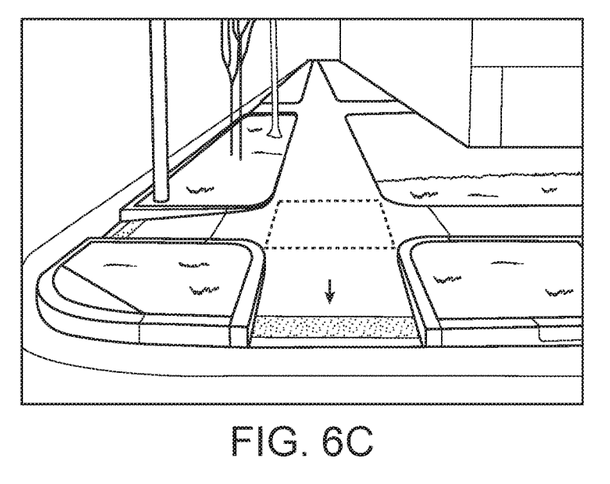
Figure 6D:
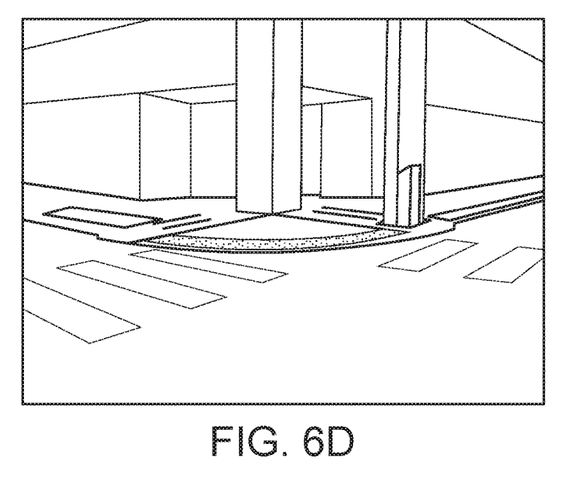

The generated odometry estimate 414 may also be transmitted to a localization logic 416 of the SPMD 450. The localization logic 416 may further receive the tile segments 432 as well as data from the GPS sensor 410. Using the inputs, the localization logic 416 may determine the location of the SPMD 450 on the tile segments 432. The localization logic 416, along with a semantic layer query logic 418, may be configured to identify the location of the SPMD 450 within the map 426 (e.g., the tile segments 432) in addition to the relation of the SPMD 450 to semantic layers 430 of geo-referenced temporally static information such as, but not limited to, sidewalk edges, ramps, street furniture, vegetation, valid SPMD parking areas, curb-cuts, and pedestrian crosswalks, as illustrated in FIGS. 6A-6B.

According to various embodiments, a SPMD may share the map tile segments that are generated using the sensor information for that SPMD with other SPMDs. For example, in some embodiments, a plurality of SPMDs may form a fleet. Members of the fleet may share map-related data among themselves. In addition, members of fleet as well as members of other fleets, other SPMDs may share the map-related information with a cloud-based server (e.g., a remote server). Crowd-sourced sensor data from any SPMD in any fleet of SPMDs (as well as other forms of technologies such as self-driving cars, sidewalk robots or sensor-equipped commercial vehicles) may be used to build, update and merge map data. The tiled maps may be distributed to all SPMDs in the fleet(s). In some embodiments, the tiled maps may be distributed to a subset of SPMDs in the fleet (e.g., to the SPMDs within a predetermined range). The tiling allows the map data to be smaller when distributing to the fleet via a communication channel, and the SPMD may request new map tiles when it needs to operate in an area where the SPMD does not already have map data available.

A SPMD's understanding of its location with respect to its surroundings may drift over time if relying on odometry estimation alone. According to various embodiments, localization techniques may be applied to constrain the drift. A localization logic 416 of the SPMD 450 may take the odometry estimate 414 and the tile segments 432 to constraint the odometry drift by matching strong observable spatial features (e.g., landmarks) in the sensor data (e.g., odometry estimate 414) against prior landmarks that exist in the tile segments 432. When a match is found, the odometry drift uncertainty is reset.

Once a SPMD understands where the SPMD is located with respect to its surroundings, the SPMD may need to determine where it is going. The SPMD may be provided with a route (e.g., path). Alternatively, the SPMD may calculate the route using the path calculation logic 314. In some embodiments, the route may be computed by solving a graph optimization problem representing the transport network that accounts for various factors including, but not limited to, distance, topology, traffic, and street infrastructure. Possible graph traversal algorithms may include Dijkstra's, A*, Floyd-Warshall, or Johnson's algorithm. The path determined by the SPMD travels through an area closed to vehicular traffic. That is, the path travels through one or more of a sidewalk or a designated route which is closed to road vehicles such as automobiles, buses, trucks, etc.

Figure 5:
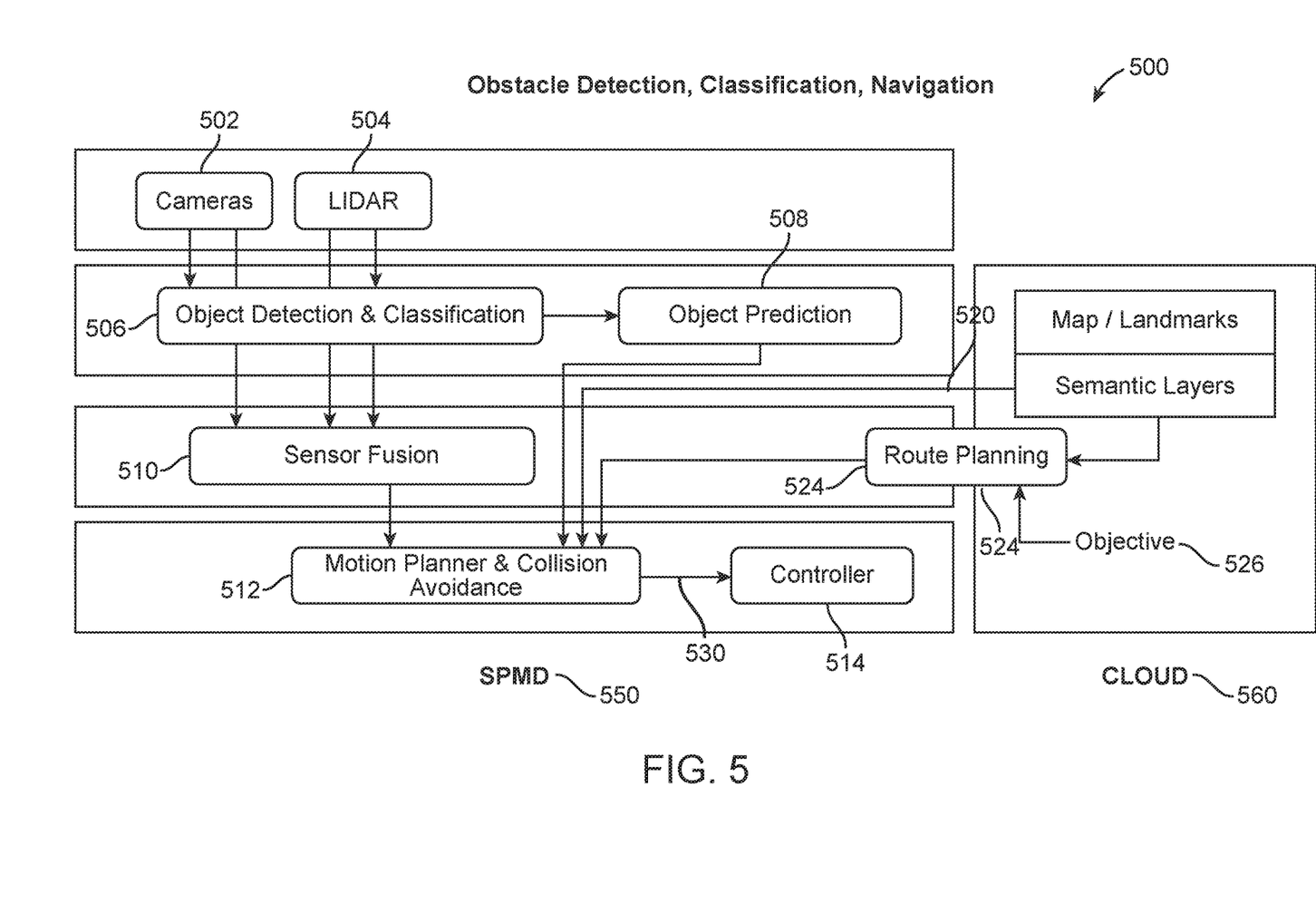
FIG. 5 is a block diagram illustrating an exemplary obstacle detection, classification and navigation processing by the SPMD according to an embodiment of the disclosure.

According to various embodiments, the planned route may not necessarily be clear of obstacles. The SPMD must navigate the path using an obstacle detection algorithm to observe and react in real-time using the on-board sensors. FIG. 5 is a block diagram 500 illustrating an exemplary obstacle detection, classification and navigation processing by the SPMD 550 according to an embodiment of the disclosure.

The SPMD may calculate the route to the target location indicated by the user using a route planning algorithm 524 based on the most up to date map data from a current geolocation of the SPMD to an objective 526 (e.g., destination) of the SPMD. However, as provided above, the route may include obstacles that need to be detected in real-time while the SPMD self-drives on the route.

The imaging sensors (e.g., imaging cameras) 502 and the depth sensors (e.g., LIDAR, ultrasonic cameras, stereo cameras, depth cameras) 504 may be used in connection with the obstacle identification logic 318 for real-time navigation to detect obstacles. Measurements (e.g., asynchronous measurements) or detection from the imaging sensors 502 and depth sensors 504 may be provided to an object detection and classification logic 506. The object detection and classification logic 506 may combine the received sensor data into a probabilistic representation of the surroundings. Using machine learning models, the detected obstacles may be identified as stationary (e.g., walls, poles, parking meters), or dynamic such as other road users (e.g., pedestrians, bicyclist, animals, cars).

According to various embodiments, the trajectory of dynamic obstacles may be calculated (predicted) to estimate the possibility of a collision by first classifying the object type (e.g., bicycle) and then using a kino-dynamic motion model for that object type to extrapolate a future position of the dynamic obstacle. This may be done by an object prediction logic 508 using the output from the object detection and classification logic 506. Since the intent of the dynamic obstacle is unknown, the object prediction logic 508 may output the future position of the dynamic obstacle with an estimate of uncertainty to a motion planner and collision avoidance logic 512. The motion planner and collision avoidance logic 512 may evaluate the input from the object prediction logic 508 when making motion planning and collision avoidance decisions. One such technique for motion planning and collision avoidance may utilize (1) the detection, classification, and tracking of obstacles as output from the object prediction logic 508, (2) information about the predetermined path as output by the sensors 502, 504 (the output by the sensors 502 and 504 may be combined by a sensor fusion logic 510 and provided to the motion planner and collision avoidance logic 512), (3) data 520 from the maps and landmarks as well as semantic layers (e.g. as provided by a cloud server 560) as inputs. These inputs may be provided to a nonlinear optimization problem where the output of the optimization is a collision-free, dynamically-constrained trajectory 530 that the SPMD 550 may follow. Traversal of the trajectory 530 (e.g., path, route) may be computed using any one of various kinematic and dynamic motion models (e.g., bicycle, differential drive, tricycle) describing the capabilities of the SPMD type to design a feedback controller 514 that ensures that the SPMD 550 follows the designated trajectory 530 provided by the motion planner and collision avoidance logic 512.

Figure 7:
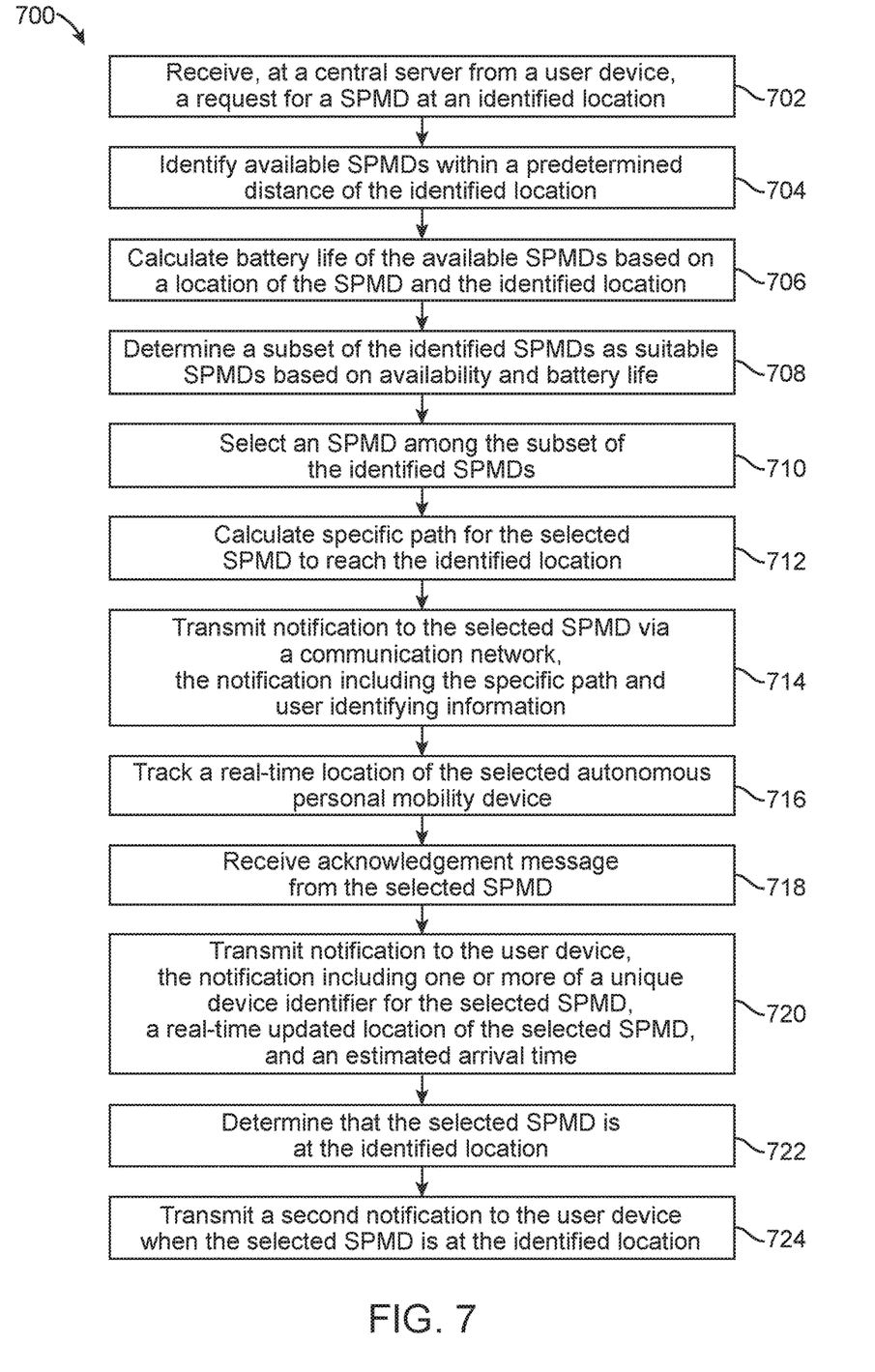
FIG. 7 is an exemplary flowchart of steps performed by the central server for detecting, selecting and routing a SPMD to a location according to an embodiment of the disclosure.

FIG. 7 is an exemplary flowchart 700 of steps performed by the central server for detecting, selecting and routing a SPMD to a target location according to an embodiment of the disclosure.

At step S702, the central server may receive a request for a SPMD at an identified (e.g. target) location from a user device over a first communication network. According to some embodiments, the user may have a ride sharing application installed on the user device. Alternatively, the user may use a website, SMS text message or a phone call to send the request for the SPMD to the central server. The identified location may be the location of the user as identified by a positioning system (e.g., GPS) sensor of the user device, or a location manually entered by the used. The target location does not have to be that of the user, for example the user may request the SPMD for a friend.

At step S704, the central server may identify one or more available SPMDs within a predetermined distance of the identified location. For example, the central server may locate the SPMDs by sending a signal to (and receiving a response signal from) the SPMDs. Alternatively, the central server may locate the SPMDs by using a positioning system sensor coupled to the SPMDs. The central server may identify the one or more available SPMDs using the SPMD identifying logic 214 illustrated in FIG. 2.

At step S706, the central server may calculate the battery life of the available SPMDs based on a distance between each SPMD and the identified location indicated by the user. For example, the central server may determine the distance between each SPMD and the identified location indicated by the user. The central server may then request the battery life of the available SPMDs. For example, the central server may transmit a battery life request message to (and receive a response from) each available SPMD. Alternatively, the SPMDs may periodically report their remaining battery charge to the central server. As such, the central server may know, at any given time, the remaining battery charge for each SPMD in the fleet. Then, the SPMD may determine whether the remaining battery charge of each available SPMD is enough to at least cover the distance between that SPMD and the identified location indicated by the user. That is, the central server may determine whether the remaining battery charge for a given SPMD is greater than or equal to a battery charge required for the SPMD to self-drive to the identified location. The central server may calculate the battery life of the available SPMDs using the battery life calculating logic 212 illustrated in FIG. 2.

At step S708, the central server may determine a subset of the identified SPMDs as suitable SPMDs based on availability and battery life. The suitable SPMDs are those SPMDs whose remaining battery charge is enough to at least cover the distance between that SPMD and the identified location indicated by the user. That is, a suitable SPMD has remaining battery charge that is greater than or equal to a battery charge required for the SPMD to self-drive to the identified location. The central server may determine a subset of the identified SPMDs as suitable SPMDs using the SPMD identifying logic 214 illustrated in FIG. 2.

At step S710, the central server may select a SPMD among the subset of the identified SPMDs based on availability and battery charge. According to some embodiments, the central server may select the SPMD in view of a predetermined criteria including but not limited to the age of SPMD, the condition of SPMD, the accessories coupled to SPMD, advertisements provided on SPMD. The central server may select the SPMD using the SPMD selecting logic 216 illustrated in FIG. 2.

At step S712, the central server may calculate a specific path for the selected SPMD to reach the identified location. For example, the central server may use maps (e.g., those provided by the SPMDs in the fleet as well as other maps) and other information (e.g., geolocation information, city sidewalk or road maintenance data, weather forecast, paths for other SPMDs in the area) in calculating the specific path for the selected SPMD. The central server may calculate the specific path using the path calculation logic 210 illustrated in FIG. 2. As discussed above, this step may be optional for the central server and the specific path may be calculated by the selected SPMD itself. The specific path travels through an area closed to vehicular traffic. That is, the specific path travels through one or more of a sidewalk or a designated route which is closed to road vehicles such as automobiles, buses, trucks, etc.

At step S714, the central server may transmit notification to the selected SPMD via a second communication network. The notification may include the identified location, the specific path (if applicable) and user identifying information. The central server may transmit the notification to the selected SPMD using the communication interface 206 illustrated in FIG. 2.

At step S716, the central server may track a real-time location of the selected SPMD. For example, the central server may track the selected SPMD by sending a signal to (and receiving a response signal from) the selected SPMD. Alternatively, the central server may track the selected SPMD by using a GPS sensor coupled to the SPMDs. The central server may track the selected SPMD using the real-time tracking logic 220 illustrated in FIG. 2.

In some embodiments, at step S718, the central server may receive an acknowledgement message from the selected SPMD. For example, the selected SPMD may confirm the receipt of the notification and processing of the specified path. In some embodiments, the SPMD may calculate the specified path itself, and may share the calculated path with the central server in the acknowledgement message.

At step S720, the central server may transmit a first notification to the user device via the first communication network. The first notification may include one or more of a unique device identifier for the selected SPMD, a real-time updated location of the selected SPMD, and an estimated arrival time of the SPMD at the identified location.

At step S722, the central server may determine that the selected SPMD is at the identified location. Upon determining that the SPMD is at the identified location, at step S724, the central server may transmit a second notification to the user device over the first communication network informing the user that the selected SPMD is at the identified location.

Figure 8:
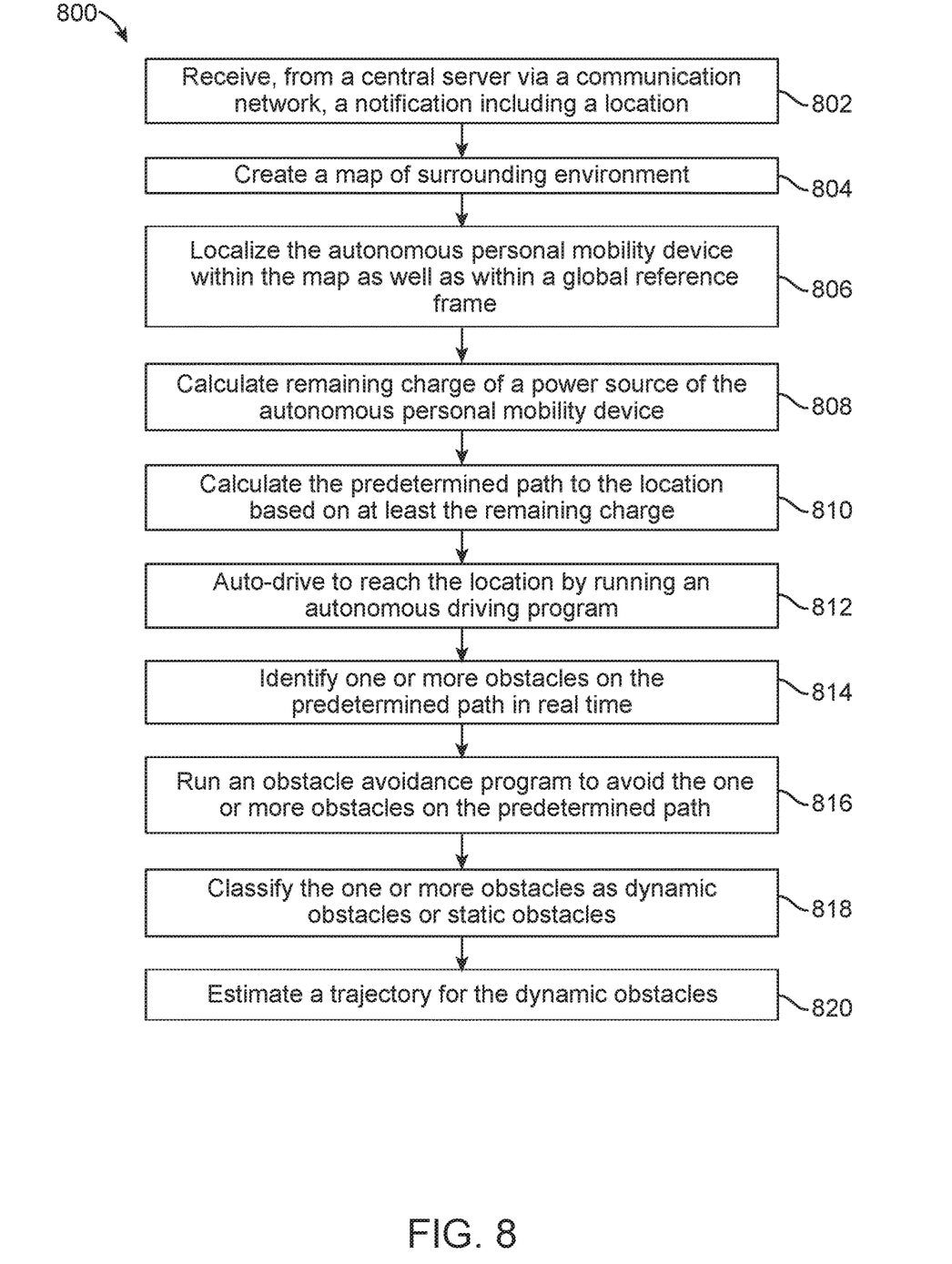
FIG. 8 is an exemplary flowchart of steps performed by the SPMD for self guiding to a location according to an embodiment of the disclosure.

FIG. 8 is an exemplary flowchart of steps 800 performed by the SPMD for self guiding (e.g., self-driving) to a target location according to an embodiment of the disclosure.

At step S802, the SPMD may receive a notification from a central server via a communication network. The notification may include a target location where the SPMD should self-drive to. In some embodiments, the notification may include a predetermined path (calculated by the central server) for the SPMD to reach the target location, and/or user identifying information.

At step S804, the SPMD may create a map of the surrounding environment. For example, the SPMD may retrieve sensor data from on-board sensors, and optionally receive additional data from external sources for generating the map. In some embodiments, the SPMD may interact with a cloud server (e.g., a remote server) for generating the maps. The maps may be tiled to form smaller sized shareable maps. For example, the SPMD may transform the map into a plurality of tile segments. In some embodiments, the tile segments may be uniformly-sized. The SPMD may transmit the plurality of tile segments to a remote server or to one or more SPMDs. That is, one or more tile segments of the map may be shared with other SPMDs. Similarly, the SPMD may receive one or more tile segments from other SPMDs. Based on the received tile segments from other SPMDs, the SPMD may avoid generating duplicate tile segments, therefore increasing the efficiency and speed of map generation while conserving battery life.

At step S806, the SPMD may localize itself within the map as well as within a global reference frame. For example, the SPMD may generate an odometry estimate (e.g., change in motion, egomotion) of the SPMD over time. The SPMD may use the odometry estimate along with data from its GPS sensor and map (e.g., tile segments that SPMD generated and/or received from the cloud server or other SPMDs) to determine the location of the SPMD on the tile segments, and in relation with geo-referenced temporally static information such as, but not limited to, sidewalk edges, ramps, street furniture, vegetation, valid SPMD parking areas, curbcuts, and pedestrian crosswalks, as illustrated in FIG. 6A-6D.

In some embodiments, the SPMD may calculate the path (e.g. the predetermined path) itself. For example, at optional step S808, the SPMD may calculate remaining charge of power source (e.g., battery) of the SPMD. At optional step S810, the SPMD may calculate the predetermined path to the target location based on at least the remaining charge. The SPMD may also calculate the predetermined path based on additional input (e.g., geolocation information, city sidewalk or road maintenance data, weather forecast, paths for other SPMDs in the area).

At step S812, the SPMD may self-drive to the target location. This step may include the SPMD running an autonomous driving program to reach the target location using the predetermined path. For example, the autonomous driving program may be configured to operate a vehicle system of the SPMD according to the predetermined path. The autonomous driving program may identify a direction for the SPMD and provide instructions to the vehicle system for moving substantially in the identified direction. The instructions may initiate movement with the chassis, wheels, and other components of the SPMD to propel SPMD in the direction identified. Prior to initiating the autonomous driving program, the SPMD may detach from a parking station where it was stationed.

At step S814, the SPMD may identify one or more obstacles on the predetermined path in real time. For example, the SPMD may execute an obstacle detection algorithm to observe the path for obstacles and react in real-time using the on-board sensors. SPMD may provide data from on-board sensors to the obstacle detection algorithm. The object detection algorithm may generate a probabilistic representation of SPMD's surroundings using the sensor data. Using machine learning models, the detected obstacles may be identified as stationary (e.g., walls, poles, parking meters), or dynamic such as other road users (e.g., pedestrians, bicyclist, animals, cars).

At step S816, the SPMD may run an obstacle avoidance program to avoid the one or more obstacles on the predetermined path. The obstacle avoidance program implements one or more modifications to the predetermined path. In some embodiments, the one or more modifications may be within predetermined thresholds (e.g., +/−x meters in a direction, +/−y degrees from an axis, +/−z meters per second within current speed).

In some embodiments, at optional step S818, the SPMD may classify the one or more obstacles as dynamic obstacles or static obstacles. At optional step S820, the SPMD may estimate a trajectory for the dynamic objects. The obstacle avoidance program avoid the dynamic obstacles based on the estimated trajectory.

According to various embodiments, when the SPMD arrives at the target location indicated by the user, the SPMD may communicate with the user device. For example, the SPMD may receive a user identifier from the user device via, for example, NFC capability of the SPMD. The SPMD may compare the user identifier received from the user to the user identifier provided by the central server in the notification. If the user identifiers match, the SPMD may switch the control of the SPMD to the user. If the user identifiers do not match, the SPMD may generate and display an error message. The SPMD may transmit the error message to the central server notifying the central server of the mismatch.

Embodiments provide an autonomous or semi-autonomous, self-driving personal mobility device (e.g., electric scooter) that may self-drive itself to a target location received from a remote central server. The target location may be a location requested by a user, or may be a location picked by the central server to guide the SPMD to a parking station or to a maintenance location. The SPMD may receive a predetermined path to reach the target location from the remote central server. Alternatively, the SPMD may calculate the path itself. The SPMD is capable of generating maps of the surrounding environment and is capable of generating tile segments of the maps. The tile segments may be shared with the remote central server and other SPMDs to improve self-driving capabilities.

Accordingly, embodiments provide SPMDs that can be requested by a user via, for example, a user device, and can be routed to the user by a central server. The SPMD self-drives to the target location indicated by the user therefore eliminating the issues in connecting the user with a SPMD. In addition, remotely identifying an available SPMD and routing the SPMD to the user ensures that the user gets a SPMD even though one may not be readily available in the immediate surroundings of the user, or may not be readily visible to the user. In addition, matching the SPMD with the user upon demand eliminates multiple users trying to claim the same SPMD. Embodiments effectively use available SPMDs by making smart matches between users and SPMDs without having to increase the number of SPMDs in the fleet.

While the principles of the disclosure have been described above in connection with specific apparatuses and methods, it is to be clearly understood that this description is made only by way of example and not as limitation on the scope of the disclosure.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

What is claimed is:

1. An autonomous personal mobility device comprising:
a vehicle system comprising mechanics and a power source to propel the autonomous personal mobility device along a designated path closed to vehicular traffic;
a processor coupled to the vehicle system; and
a non-transitory computer readable media coupled to the processor, the non-transitory computer readable media including instructions that, when executed by the processor, cause the processor to:
receive, from a central server via a communication network, a battery life request message;
in response to the battery life request message, provide, to the central server via the communication network, a response message that includes a remaining battery charge measurement associated with the power source of the autonomous personal mobility device;
receive, from the central server via the communication network, a notification including a target location for the autonomous personal mobility device, wherein the target location is located at an area closed to vehicular traffic;
run an autonomous driving program to reach the target location using a predetermined path, wherein the predetermined path travels through areas closed to vehicular traffic;
identify one or more obstacles on the predetermined path in real time;
run an obstacle avoidance program to avoid the one or more obstacles on the predetermined path, wherein the obstacle avoidance program implements one or more modifications to the predetermined path to avoid the one or more obstacles on the predetermined path; and cause the autonomous personal mobility device to auto-drive to reach the target location based at least in part on the one or more modifications to the predetermined path to avoid the one or more obstacles on the predetermined path;

create a map of surrounding environment; and localize the autonomous personal mobility device within the map as well as within a global reference frame, wherein the obstacle avoidance program avoids the one or more obstacles on the predetermined path based on the map and localization of the autonomous personal mobility device within the map.

2. The autonomous personal mobility device of claim 1, wherein the instructions, when executed by the processor, further cause the processor to: calculate the predetermined path to the target location.

3. The autonomous personal mobility device of claim 2, wherein the instructions, when executed by the processor, further cause the processor to:

calculate a remaining charge of the power source; and calculate the predetermined path to the target location based on at least the remaining charge.

4. The autonomous personal mobility device of claim 1, wherein the instructions, when executed by the processor, further cause the processor to:

classify the one or more obstacles as dynamic obstacles or static obstacles; and estimate a trajectory in areas closed to vehicular traffic for the dynamic obstacles, wherein the obstacle avoidance program avoids the dynamic obstacles based on the estimated trajectory.

5. The autonomous personal mobility device of claim 1, wherein the instructions, when executed by the processor, further cause the processor to:

upon receiving the notification including the target location from the central server:

transmit, to the central server via the communication network, an acknowledgement message; and detach from a parking station.

6. The autonomous personal mobility device of claim 1, wherein the instructions, when executed by the processor, further cause the processor to:

transform the map to a plurality of tile segments; and transmit the plurality of tile segments to a remote server or one or more additional autonomous personal mobility devices.

7. A method implemented by a processor of an autonomous personal mobility device, the method comprising:

receiving, from a central server via a communication network, a battery life request message;

in response to the battery life request message, providing, to the central server via the communication network, a response message that includes a remaining battery charge measurement associated with a power source of the autonomous personal mobility device;

receiving, from the central server via the communication network, a notification including a target location for the autonomous personal mobility device, wherein the target location is located at an area closed to vehicular traffic;

running an autonomous driving program to reach the target location using a predetermined path, wherein the predetermined path travels through areas closed to vehicular traffic;

identifying one or more obstacles on the predetermined path in real time;

running an obstacle avoidance program to avoid the one or more obstacles on the predetermined path, wherein the obstacle avoidance program implements one or more modifications to the predetermined path to avoid the one or more obstacles on the predetermined path; and auto-driving to reach the target location based at least in part on the one or more modifications to the predetermined path to avoid the one or more obstacles on the predetermined path;

creating a map of a surrounding environment; and localizing the autonomous personal mobility device within the map as well as within a global reference frame, wherein the obstacle avoidance program avoids the one or more obstacles on the predetermined path based on the map and localization of the autonomous personal mobility device within the map.

8. The method of claim 7, further comprising: calculating the predetermined path to the target location.

9. The method of claim 8, further comprising:

calculating remaining charge of a power source of the autonomous personal mobility device; and calculating the predetermined path to the target location based on at least the remaining charge.

10. The method of claim 7, further comprising:

classifying the one or more obstacles as dynamic obstacles or static obstacles; and estimating a trajectory in areas closed to vehicular traffic for the dynamic obstacles, wherein the obstacle avoidance program avoids the dynamic obstacles based on the estimated trajectory.

11. The method of claim 7, further comprising:

upon receiving the notification including the target location from the central server: transmitting, to the central server via the communication network, an acknowledgement message; and detaching from a parking station.

12. The method of claim 7, further comprising:

transforming the map to a plurality of tile segments; and transmitting the plurality of tile segments to a remote server or one or more additional autonomous personal mobility devices.

* * * * *